Nov. 29, 1949     R. KOECHLIN     2,489,296
SYSTEM FOR MEASURING FREQUENCY DEVIATIONS
Filed June 22, 1943     2 Sheets-Sheet 1

INVENTOR.
RENAUD KOECHLIN
BY
AGENT

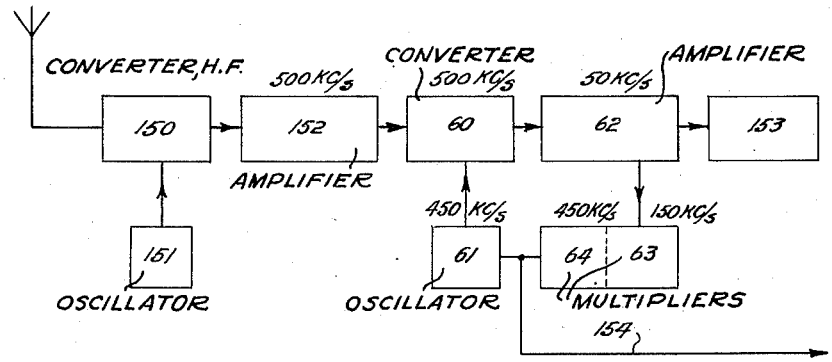
Fig. 3.
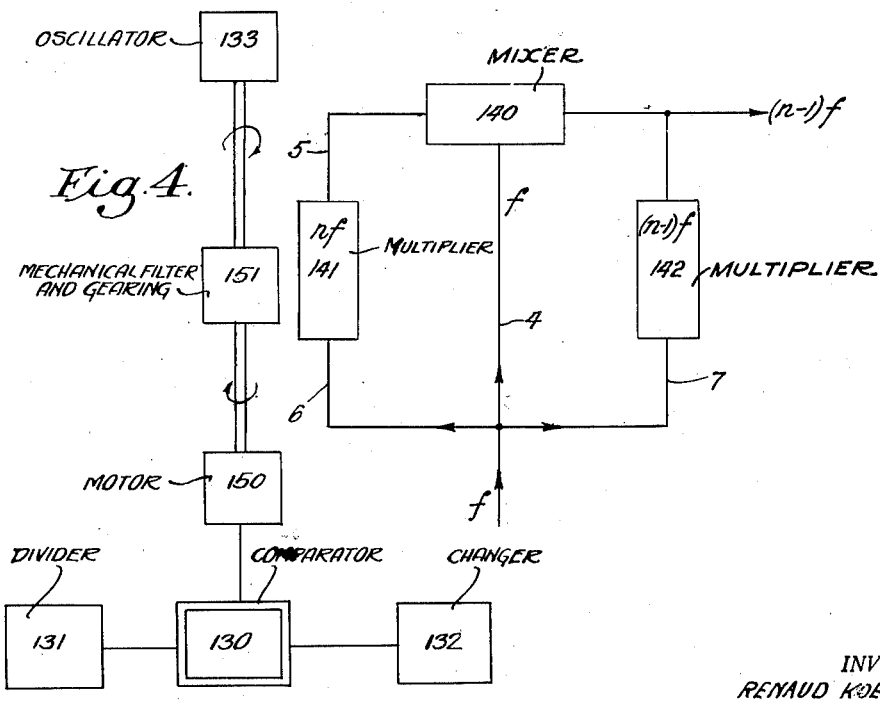
Fig. 2.
Fig. 4.

Patented Nov. 29, 1949

2,489,296

UNITED STATES PATENT OFFICE 2,489,296

SYSTEM FOR MEASURING FREQUENCY DEVIATIONS

Renaud Koechlin, Boulogne-Billancourt, France, assignor to International Standard Electric Corporation, New York, N. Y., a corporation of Delaware Application June 22, 1943, Serial No. 491,803 In France February 5, 1942

Section 1, Public Law 690, August 8, 1946 Patent expires February 5, 1962

5 Claims. (Cl. 250—39)

The present invention concerns improvements and modifications of the apparatus described in the U. S. patent application filed on June 22, 1943, Serial No. 491,802, Patent Number 2,423,103, by the applicant under the title, "System for measuring frequency deviations."

According to one of its forms, the present invention has for one object to provide modifications in the frequency drift and phase indicator apparatus described in the above-identified patent application.

According to another of its forms, this invention has for a further object to provide applications of certain circuits described in the above-identified patent application, to frequency multiplier circuits at reduced dephasage.

According to still another form, an additional object of this invention is to provide applications of frequency divider and multiplier circuits with synchronized frequency changers, as described in the above-identified patent application, to radio receivers of high selectivity.

Certain embodiments of this invention are shown in detail in the following description and in the attached drawings, in which:

Fig. 2 shows schematically an example of the application of circuits with a changer of synchronized frequency, to frequency multiplier assemblies at reduced dephasage;

Figure 1:
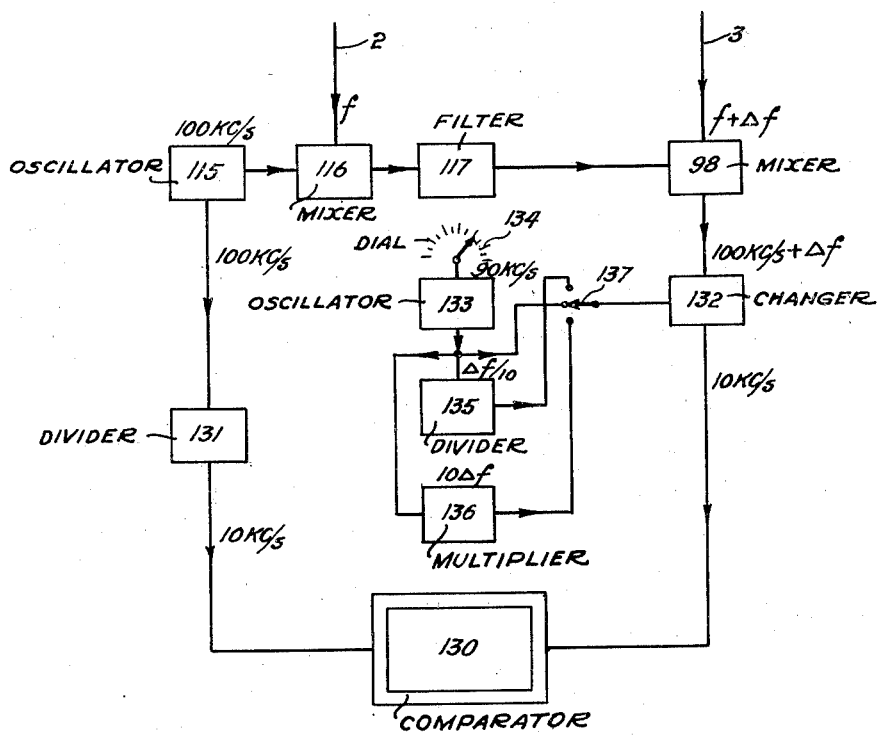
Fig. 1 shows schematically an example of a modification of the frequency drift and phase indicator apparatus shown in the above-identified patent application, for obtaining a direct reading of the drift or phase.

Fig. 3 represents schematically an example of the application of one frequency divider circuit of the above-identified patent application to a radio receiver of high selectivity; and Fig. 4 shows schematically an example of a modification that might be made in the frequency drift and phase indicator apparatus shown in Fig. 1 for supplying automatic adjustments in obtaining a direct reading of the drift or phase.

According to certain of its embodiments, the present invention comprises variants of the frequency drift and phase indicator devices described in the above-identified patent application, principally with respect to the complete assemblies for comparing frequency and phase drift. The invention of this former application provides means for showing a relative drift of two frequencies brought back to the same comparison frequency by dividing and/or multiplying, by means of beating with auxiliary frequencies.

In the case where the comparison frequency happens to be the same as the frequencies to be compared, the multiplication of the drift may be made, according to one embodiment of the invention of this application, by multiplying one of the frequencies to be compared, for example, the reference frequency, by the factor $kF_1$ and the other frequency, or frequency to be observed, by the factor $k$. These multiplied frequencies are then made to beat together in order to obtain a beat oscillation at the comparison frequency—thus permitting one to re-establish the original frequency of the oscillations to be compared. The difference frequency obtained keeps the multiplication of the drift by the factor $k$, by which one has acted upon the frequency to be observed.

The division of the drift in this same case may be effected, according to another embodiment of the invention of this application, by multiplying for example the reference frequency by a factor $kF_1$ and by then making it beat with the variable frequency. One thus obtains a beat frequency $k$ times higher, keeping constant the drift of the frequency to be studied with respect to the reference frequency. Then one divides this beat frequency by the factor $k$. The resulting frequency recovers the original value of the oscillations to be compared, but possesses a drift equal to the original drift divided by $k$.

In a case where the frequencies to be compared, entering into the apparatus, may have a relationship $k$ with the frequencies leaving the apparatus, to feed the comparator or the apparatus used, the division of the drift may be made, according to one use of the invention, by changing the frequency by an auxiliary synchronized oscillator permitting one to perceive the action. Each of the two frequencies to be compared is divided by a factor $k$ by means of a change in frequency in which one of the frequencies may be the incident frequency and the other a frequency obtained from an auxiliary oscillator placed at any point in the circuit. This oscillator is synchronized with the average frequency or with one of its harmonics, which assures the division of the drift at the time of the change in frequency.

In order to obtain a multiplication of the drift, one multiplies, according to another embodiment of the invention of this application, the output frequency displayed, by the drift obtained from a changer stage of the frequency to be observed. After that one brings about a new change in frequency in order to bring back the multiplied frequency to the comparison frequency with a multiplied drift.

According to another of its uses, the invention of this application provides in such circuits for the use of a first change in frequency simultaneously upon two paths in order to bring back the frequency of an oscillation to be observed to a fixed value, such as that at the input of the drift multiplying or dividing apparatus. The reference path which is now obtained from an oscillation of the same frequency as the oscillation to be observed, or in harmonic relation with it, is subjected, as well as the path of the oscillation to be observed, to a first change in frequency by means of suitably fixed auxiliary oscillation common to the two paths.

Such a change in frequency simultaneously, upon two paths, has the known property of keeping constant the phase relations between the two incident frequencies in spite of the variations of frequency of the adjusting oscillator. Nevertheless, the value of the average frequency resulting from the changes in frequency varies with the frequency of the adjusting oscillator. In certain cases, when the measuring circuits are complex and sensitive to the variations of frequencies, the variation of the average frequency may give rise to errors in measurement, especially for phase angles of very small magnitude.

In order to avoid this inconvenience, the invention of this application provides, according to another variation, a method permitting one to bring back the drift or phase angle to a frequency which is exactly that for which all the circuits have been adjusted. This process consists in obtaining the average frequency $f$ of the apparatus on which one superposes the drift to be shown, by making the input frequency $F+\Delta F$ beat with a frequency $F+f$, itself obtained by making the reference frequency $F$ beat in an auxiliary mixer with a frequency $f$, produced by a generator of fixed frequency.

A variation of this method, especially suitable for measuring phases, consists, according to another form of the invention, in obtaining the frequency $F+f$ as indicated above, and in obtaining the two average frequencies $f$ on the one hand and $f+\Delta f$ on the other hand, by supplying a mixer upon each of the paths with the frequency $F+f$ and the respective frequencies $F$ and $F+\Delta F$. This procedure presents the advantage of assuring a better symmetry between the two paths, especially relative to the dephasing introduced by a band pass filter serving to isolate the frequency $F+f$.

If the band of frequencies does not agree with the desired purpose one may, according to another use of the invention of this application, arrange the apparatus which has just been described for a change in frequency in two known steps. In this manner the regulation of the frequency of the two-step changer-oscillator will not be critical. Especially at high frequencies, the stability of this oscillator will no longer play an important part.

In the apparatus of the above-identified patent application, the measurement of the frequency and phase differences between two alternating current waves required the time measurement of the number of turns in a given time of the luminous index on the circle of sweep of the cathode ray indicator, or, what is the same thing, the measurement of the time necessary for a certain number of revolutions of the spot along the circular sweep path. This procedure required therefore an auxiliary known quantity, namely, the duration of the measurement, which involved certain inconveniences in making observations.

In particular, when the value of the observed frequency drift varies relatively rapidly with respect to the duration of the period of the oscillation, the observation will only show the average drift. Or, especially for the study of oscillators of very high stability, it is sometimes desirable to draw the curve of the frequency drift, which may be a curve of rapid phase deviation. The devices which are herein described permit the making of very rapid measurements of the frequency drift or of the phase variation of an oscillation, with a direct reading of this drift or variation.

According to one embodiment of this invention, circuits are provided for the wave to be analyzed and for a reference wave, with means for introducing a frequency drift of known value, marked on a dial graduated directly in drifts. This additional drift in such a way as to annul the drift is varied which is characteristic of the wave to be observed.

According to another form of this invention, the observation of the zero beat between the drifts is made on an indicator with a low time constant, for example on a cathode ray indicator, means being provided for permitting one to obtain the reading either of the simple drift or of a multiplied or divided drift. It therefore will be apparent that this indicator need not be standardized, since the measurement is effected by a zero or null method.

Fig. 1 shows schematically an example of such an apparatus. In this figure, the elements corresponding to those of Fig. 13 of the above-identified patent application have been designated by the same reference numbers.

The reference frequency $f$ enters into the mixer 116, by wire 2, the mixer also being supplied by the stabilized oscillator 115 of 100 kc./s. for example. The oscillation of beat frequency $f\pm 100$ kc./s. passes through the filter 117, which transmits only one of the two beat frequencies; i. e., either $f+100$ kc./s. or $f-100$ kc./s.

The frequency to be observed, $f+\Delta f$ is introduced into the mixer 98 by wire 3, the mixer 98 also being supplied by the frequency leaving the filter 117. The beat frequency leaving the mixer 98 will therefore be 100 kc./s.$\pm\Delta f$, $\Delta f$ being the incremental frequency drift or variation from its standard or reference frequency, $f$.

The two frequencies to be compared are therefore the frequency of 100 kc./s. generated by the stabilized oscillator 115 and the frequency of 100 kc./s.$\pm\Delta f$ leaving the mixer 98. The comparator apparatus, which may be of any convenient type, as well known in the art, such as of the electromechanical or electronic type, is schematically shown at 130, and functions as a zero or null indicator, at a frequency of 10 kc./s., for example.

In the reference frequency circuit, the stable frequency of 100 kc./s., coming from the oscillator 115, is divided by a frequency divider circuit 131 of any appropriate type. In the measurement path, the frequency of 100 kc./s$\pm\Delta f$ is led to a frequency mixer 132, permitting one to bring back the oscillation to the exact frequency of 10 kc./s. by mixing it with a frequency of 90 kc./s.$-\Delta f$ coming from a second oscillator, 133, also of high stability. With this oscillator 133 there is associated a vernier tuning dial, 134, graduated in cycles and fractions of cycles per second, permitting the operator to read directly the drift introduced.

With this standardized oscillator 133 there are also associated two circuits, one, 135, for dividing the drift $\Delta f$ by 10, and the other, 136, for multiplying the drift by 10, on the other hand. Such drift divider or multiplier circuits have been described in detail in the patent application, supra.

In one drift multiplier circuit, two frequencies $f$ and $f+\Delta f$ are each doubled, giving $2f$ and $2f+2\Delta f$. The latter frequency is multiplied by 5 and the former frequency is multiplied by 4, yielding $10f+10\Delta f$, and $8f$, respectively, which last frequencies are mixed, yielding $2f+10\Delta f$.

In one drift divider circuit, two frequencies $f$ and $f+\Delta f$ are to be observed. Frequency $f$ is multiplied by 9, giving $9f$, which is mixed with $f+\Delta f$. This yields a beat of $10f+\Delta f$. By dividing this latter, using means well known in the art, a resultant of $$f+\frac{\Delta f}{10}$$

is obtained.

A switch, 137, permits one predeterminedly to connect the frequency of the standardized oscillator, either with the simple drift $\Delta f$, or with this drift after it has been divided or multiplied by a factor of 10.

The oscillation, 10 kc./s., leaving the mixer 132, is now applied to the measuring comparator, as is also applied the standard oscillation of 10 kc./s. The comparator apparatus 130, which preferably has substantially no inertia, will cause anomalies, instabilities or phase deviations to appear, as for example, on the screen of a cathode ray tube. The dial 134, however, will permit one to read directly the value of the drift, with a single standardized graduation multiplied by the coefficients 1/10, 1 or 10, as the particular case may determine.

For the measurement of very slight drifts, it is obviously possible to take advantage of the division of the standardized relative drift, between the two oscillators 115 and 133, to increase the apparent stability of the standardized beats in absolute value.

There are also provided, according to another embodiment of the invention, means for obtaining, in such apparatus, the direct reading of the drift in an automatic manner, by associating with the comparator apparatus 130 an automatic correcting device of appropriate type to correct the frequency of the oscillator 133. Devices of this kind are well known in the art. In this way the drift of the incident frequency $f+\Delta f$ may act to cause the readjustment of the frequency of the local oscillator 133, as for example, through the automatic rotation of the condenser, standardized as to drift, thereby likewise changing the reading of the index of the dial 134, without the intervention of the operator.

A typical circuit for showing a readjustment of the frequency of the local oscillator 133 is shown in Fig. 4. From comparator 130 is taken a beat frequency which results from the comparison of the outputs of divider 131 and changer 132. This beat frequency is applied to the input circuit of a motor 150. The mechanical rotation of the motor is passed through a mechanical filter and gearing 151 and coupled to the condenser of the oscillator 133. The rotation of the plates of the condenser varies the capacitance thereof and hence the frequency of the output. Thus the oscillator frequency is automatically adjusted until there are no variations in the frequency passed from mixer 132 to comparator 130, or in other words, until there is no drift frequency in the comparator.

It is advantageous to consider a multiplication of the drift before application to the corrective apparatus in order to disclose slight phase variations and so as to allow their immediate correction.

As one example of a corrective apparatus, one may mention an electro-mechanical differential controlling the condenser of the corrector by means of the requisite gears, or a phase bridge controlling a miniature control servo-motor. This latter method will permit an easy graphic recording of the curve of the drift.

The various forms of apparatus which have just been described may obviously be applied to other measuring and indication devices described in the above-identified patent application.

This invention also provides, according to certain embodiments thereof, for the application of frequency divider circuits, with a synchronized frequency changer, to frequency multiplier circuits, with the object of reducing the instability of the phase of the multiplied frequency. For this purpose, as shown in Fig. 2, the frequency $f$ to be multiplied, for example by $n-1$, is introduced by wire 4 into the input of a mixer 140; the frequency $nf$ is introduced by wire 5 into the input of the mixer, this latter frequency being obtained by multiplication of the frequency $f$ in a multiplier circuit 141, fed by wire 6. Finally the frequency $(n-1)f$, obtained from mixer 140 by difference, is applied in parallel with the output $(n-1)f$ of the multiplier 142, multiplier 142 is fed by wire 7. There is thus produced a reinforcing action, reducing the instability of the phase, between the two multipliers.

According to another of its embodiments, the present invention presents certain applications of frequency divider circuits to synchronized change in frequency, such as described in the above-identified patent application, for example, in relation to Fig. 6 of said patent application, in the form of apparatus which uses the simultaneous division of the drift and of the frequency.

Briefly summed up, the process for division of the frequency disclosed in the above-identified patent application consists in introducing the starting frequency, which is to be divided so as to obtain a frequency $f=F/n$ into a frequency changer apparatus, the oscillator of which is adjusted to a frequency $f(n\pm1)$ and of synchronizing this oscillator on the harmonic $n\pm1$ of the frequency $f$ resulting from the beat produced.

In such an apparatus, contrary to what happens in conventional frequency changers, when the initial frequency F deviates a given number of cycles D, the divided frequency deviates $D/n$ cycles only and not D. In effect, the oscillator of the synchronized frequency changer circuit has its frequency intimately tied up with the initial frequency F and its drift is $$D\frac{(n\pm1)}{n}$$

It is not, however, the same for a neighboring parasitic oscillation of F, only a few kilocycles per second away. For such an oscillation the frequency changer circuit behaves like an ordinary frequency changer, that is to say, it retains for the parasitic oscillation intermediate frequency the deviation which the parasitic oscillation shows with respect to the received wave. It therefore becomes easier to eliminate the parasitic oscillation intermediate frequency by the amplifier or output circuit, which is a continuation of the frequency changer stage. This amplifier may then be arranged for a band width strictly necessary for the transmission of the frequency F plus an excess equal to $D/n$, D being the estimated possible drift of the frequency F to be received at the input to the frequency changer apparatus, and does not require an excess equal to $D+d$, $d$ being the drift belonging to the non-synchronized oscillator, in a usual receiver.

The properties stated above, of such a frequency divider circuit are used, according to certain embodiments of this invention, in radio receivers, telegraphic or otherwise, having a high degree of selectivity. Fig. 3 shows schematically an example of one form of such a receiver.

In this figure, the frequency divider circuit of Fig. 6, comprising elements 60, 61, 62, 63 and 64, of the above-identified patent application is shown incorporated in the second stage frequency changer, the same reference numbers as in the above-identified patent application being given to the elements of this circuit, which comprises a frequency changer stage 60, followed by an amplifier 62 of the second intermediate frequency, from which an oscillation, multiplied in the stages 63 and 64, is derived for synchronizing the oscillator 61. This synchronized frequency changer is preceded by a high frequency stage 150 in which a first change in frequency takes place, by the action of the local oscillator 151, the oscillation of the first intermediate frequency being transmitted to the second frequency changer stage through an amplifier 152. Stages of detection and low frequency are indicated at 153, after the second frequency changer.

Such a receiver circuit avoids, on the one hand, the inconveniences due to the drift of the second oscillator and, on the other hand, reduces, in the ratio $1/n$, the drift due to the first intermediate frequency, which is added to the drift of the second oscillator in the apparatus with the usual double change in frequency, which latter increases the instability of the reception as a result of the narrow pass-band of the stage following the second frequency changer. In such a receiver as that shown in Fig. 3, on the contrary, the drift of the first intermediate frequency being reduced without addition of a supplementary drift, the added drifts of the received wave and of the first average frequency are reduced at the input to the second intermediate frequency amplifier which may, as a result, be provided with a greater degree of selectivity.

An automatic frequency correcting device, of any well known type, may if desired be provided to stabilize the first intermediate frequency, to further reduce the drift D.

The stability of the apparatus of Fig. 3, with respect to frequencies lying nearby, may be better realized by giving a numerical example. Assuming a parasitic wave situated within 2 kc./s. of the wave to be received, this deviation will still be 2 kc./s. in the amplifier 62, but the stabilizing wave obtained by multiplication by 9 of this second intermediate frequency involves an increase of 18 kc./s. of the deviation between the harmonic of the parasitic wave and the frequency of the oscillator 61. The danger of interference is therefore limited and there is no risk of producing it except under exceptional fading conditions, for a distant position of the frequency belonging to the oscillator 61. On the other hand, the frequency multiplier circuits 63 and 64, requiring only a pass-band proportional to that of the first intermediate frequency, multiplied by the degree of the harmonic, will only let pass parasitic frequencies whose deviation with respect to the fundamental frequency will be eight or ten times less than the band width of the first intermediate frequency.

In certain cases, it may be advantageous to couple the detector and low frequency stages, not at the output of the amplifier 62, but at the output of the frequency multiplier stages 63—64, as indicated at 154, in Fig. 3. This arrangement permits an increase in apparent selectivity of telegraphic receivers.

Although the invention has been described in the case of certain particular examples and embodiments, it should be understood that it is not limited thereby, but on the contrary is susceptible of numerous modifications and adaptations without departing from the scope thereof.

What is claimed is:

1. Frequency drift comparator including a source of given frequency characterized by drift in frequency, and a source of standard reference frequency having a value equal to the mean value of said given frequency, a first mixer fed by said reference frequency, a first oscillator generating a frequency removed from said reference frequency by a predetermined amount and also feeding said first mixer so as to produce two beat frequencies, filter means connected to the output of said first mixer and suppressing one of said beat frequencies, a second mixer fed by said given frequency and by the output of said filter, a frequency divider fed from said first oscillator, a frequency changer fed from said second mixer and having an output frequency substantially equal to that of said frequency divider, and a null indicator fed by the output of said frequency divider and said frequency changer, an adjustable second oscillator of relatively high stability having frequency indicating means associated therewith, and means connecting the output of said second oscillator to said frequency changer, said second oscillator being adjusted to a frequency which will beat, in said frequency changer, with the current entering therein from said second mixer and will produce a frequency yielding a null indication upon said null indicator, the value of said frequency drift being shown upon the indicating means of said adjustable second oscillator.

2. Device according to claim 1 and also including a second frequency divider connected between said adjustable oscillator and said frequency changer and acting to divide said frequency drift, whereby said indicating means will serve to read frequency drifts of relatively great amount.

3. Device according to claim 1 and also including a frequency multiplier connected between said adjustable oscillator and said frequency changer and acting to multiply said frequency drift, whereby said indicating means will serve to read frequency drifts of relatively small amount.

4. Device according to claim 1 and also including means for automatically adjusting said adjustable second oscillator until null indication is obtained.

5. The method of measuring the unknown frequency of an alternating current wave characterized by drift, comprising generating a stable wave of known frequency and of value equal to the mean value of said unknown frequency, generating a second wave of frequency removed from said stable frequency by a frequency of a predetermined and stable amount and applying said wave to a comparator, feeding a first mixer with said stable wave and said second wave whereby a beat frequency wave is produced generating an adjustable wave and indicating the frequency of said adjustable wave, combining said adjustable wave with said beat frequency wave and applying the resultant wave to said comparator, adjusting said adjustable wave until said resultant wave equals in frequency said second wave as indicated by said comparator, and indicating the frequency of said adjustable wave.

RENAUD KOECHLIN.

REFERENCES CITED

The following references are of record in the file of this patent:

UNITED STATES PATENTS

| Number | Name | Date |
|---|---|---|
| 2,115,676 | Wheeler | Apr. 26, 1938 |
| 2,153,274 | Robinson | Apr. 4, 1939 |
| 2,167,400 | Farrington | July 25, 1939 |
| 2,186,182 | Stocker et al. | Jan. 9, 1940 |
| 2,187,865 | Potter | Jan. 23, 1940 |
| 2,190,243 | Robinson | Feb. 13, 1940 |
| 2,255,645 | Blish et al. | Sept. 9, 1941 |
| 2,282,974 | Koch | May 12, 1942 |
| 2,306,435 | Graham | Dec. 29, 1942 |
| 2,321,315 | Peterson et al. | June 8, 1943 |